United States Patent [19]

Gyugyi

[11] 4,438,386

[45] Mar. 20, 1984

[54] STATIC VAR GENERATION FOR TRANSMISSION LINE COMPENSATION OF SUBSYNCHRONOUS RESONANCE

[75] Inventor: Laszlo Gyugyi, Penn Hills, Pa.

[73] Assignee: Westinghouse Electric Corp., Pittsburgh, Pa.

[21] Appl. No.: 300,841

[22] Filed: Sep. 10, 1981

[51] Int. Cl.³ .............................................. H02J 3/16
[52] U.S. Cl. ..................................... 323/210; 322/21; 322/32
[58] Field of Search ..................... 322/7, 8, 21, 29, 32; 323/205, 208–211

[56] References Cited

U.S. PATENT DOCUMENTS

| | | | |
|---|---|---|---|
| 3,999,115 | 12/1976 | South et al. | 322/32 X |
| 3,999,117 | 12/1976 | Gyugyi et al. | 323/211 |
| 4,125,884 | 11/1978 | Sun | 322/32 X |
| 4,156,176 | 5/1979 | Gyugyi et al. | 323/211 |
| 4,302,715 | 11/1981 | Putman et al. | 323/210 |

Primary Examiner—A. D. Pellinen
Attorney, Agent, or Firm—Benjamin Hudson, Jr.

[57] ABSTRACT

There is provided a static VAR generator having a novel method for controlling subsynchronous resonance by monitoring the frequency of the electrical generating system and controlling subsynchronous resonance by phase-firing thyristor controlled inductance.

2 Claims, 13 Drawing Figures

STATIC VAR GENERATION FOR TRANSMISSION LINE COMPENSATION OF SUBSYNCHRONOUS RESONANCE

CROSS-REFERENCE TO RELATED APPLICATIONS

This application is related to application Ser. No. 300,842, filed Sept. 10, 1981.

BACKGROUND OF THE INVENTION

1. Field of the Invention:

This invention relates generally to means utilized for reducing subsynchronous resonance in synchronous machines and more particularly is related to means for reducing subsynchronous resonance in synchronous machines for AC power system stability.

2. Description of the Prior Art:

In the analysis of power systems stability, it is well known that a synchronous machine connected to an infinite bus will oscillate or "hunt" under certain circuit conditions. In turbine driven generators, periodic variations in the torque applied to the generators caused periodic variations in speed or rotor oscillations. This results in periodic variations in voltage and frequency which are transmitted to the electrical power generating system. These mechanical periodic variations in torque, $\omega_M$, (mechanical resonance frequency), cause modulation of the generator voltage which results in small side band components of the electrical system nominal electrical frequency, $\omega_S$. It has been found that when a synchronous machine supplies power to a long transmission line to which series capacitors are connected for voltage regulation, the resultant line reactance may have a resonant frequency that may match the mechanical resonance frequency, $\omega_M$ that greatly amplifies the rotor oscillations (mechanical resonance frequency $\omega_M$) referred to as negative damping. In this case, the lower, or subsynchronous side band component may cause an extremely high current to flow in the electrical system. This high current may feed back magnetically through the air gap of the generator so as to excite further the oscillation of the rotating mechanical apparatus and may cause considerable physical damage such as shaft breakage in the generator.

Although various methods have been proposed for stabilizing an electrical generating system, one of particular interest is the U.S. patent application Ser. No. 048,934, filed June 15, 1979, now U.S. Pat. No. 4,302,715, entitled "Dynamic Parallel Inductive Stabilizer For Synchronous Machines Having Torsional Oscillations" and assigned to the assignee of the present application. In this application, a delta-connected, thyristor-controlled, three-phase reactor bank is employed. The current in the reactor bank is modulated according to the torsional oscillation of the rotating mechanical system using the usual technique of thyristor conduction angle control. The modulating signal used to control the thyristors is derived by measuring the velocity variation of the generator shaft, using some mechanically coupled device, such as a tooth-wheel pick-up.

SUMMARY OF THE INVENTION

There is provided by this invention a static VAR generator means that provides the capability to damp subsynchronous resonance should it occur. A novel means for controlling subsynchronous resonance is provided by monitoring the frequency of the electrical generation system and controlling subsynchronous resonance in response to disturbances caused by changes in load, switching, pulsating driving torque, self-excitation, or other disturbances that may result in voltage and frequency pulsations.

DESCRIPTION OF THE PREFERRED EMBODIMENT

Figure 1:
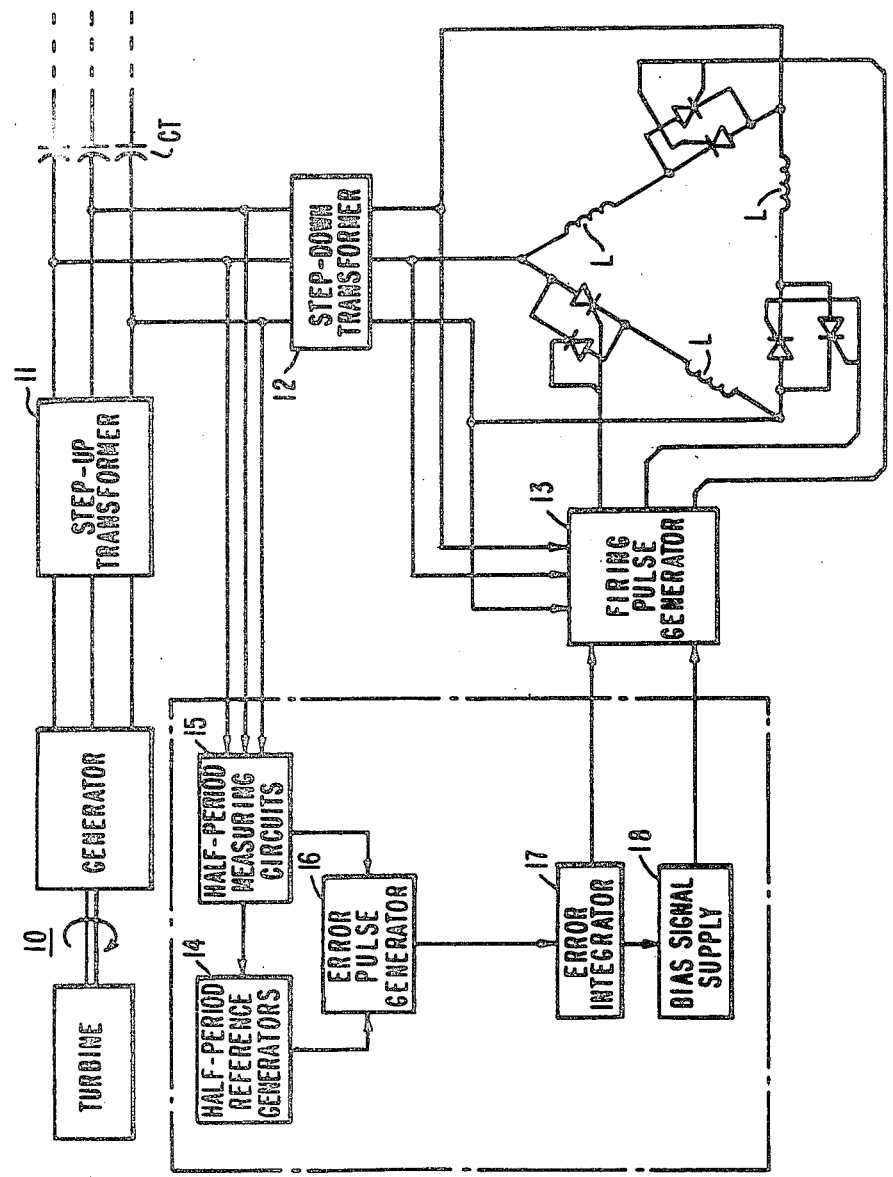
FIG. 1 is a schematic system arrangement for a static VAR generator used for damping of subsynchronous resonance.

Referring to FIG. 1, the arrangement of the VAR generator scheme is shown. The electrical system comprises a turbine driven AC generator 10 feeding a transmission line via a step-up transformer 11. The receiving end of the transmission line is terminated by an infinite bus that represents the remaining part of the power system. The inductance of the transmission line is partially compensated by a series connected capacitor CT. At an intermediate terminal of the transmission line, a static VAR generator consisting of a three-phase thyristor-controlled reactor, L, is connected via a step-down transformer 12. The current in the reactor, L, is controlled by delaying the firing pulse with respect to the time reference at which the applied AC voltage is maximum. The appropriate delay of the firing pulses, in response to an analog control signal is provided by the firing pulse generator 13. Possible realization of the firing pulse generator is described in U.S. Pat. No. 3,999,117, entitled "Method and Apparatus for Static VAR Generator and Compensator". The control signals that initiate the firing of the pulse generator 13 are derived by positive and negative half-period measuring circuits 14 and generators 15. An error pulse generator 16 develops an error signal from the two half period measuring circuits. An error integrator 17 develops a voltage signal proportional to the frequency of the AC network and initiates firing of the pulse generator 13 from a quiescent value determined by the bias signal supply 18.

Figure 2:
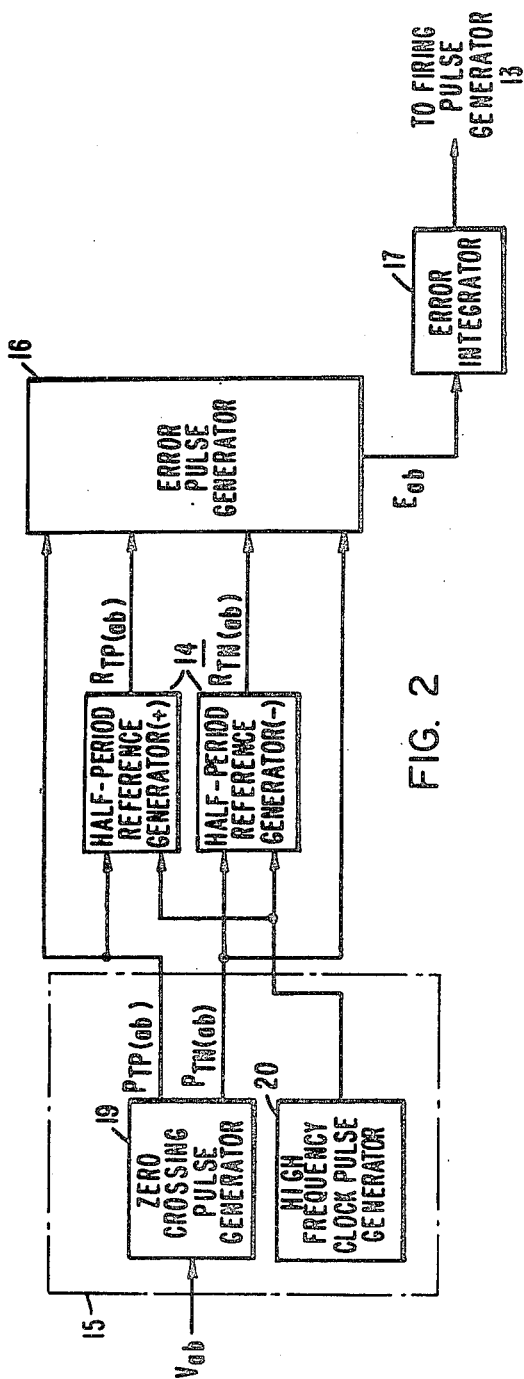
FIG. 2 is a block diagram of the control arrangement for subsynchronous resonance damping.

The basic idea of the control arrangement to damp subsynchronous resonance is to measure the half cycle period times of each of the three terminal voltages and compare these to a reference half cycle period corresponding to the unmodulated 60 Hz. terminal voltage. Referring to FIGS. 2, 3, and 4, there is shown at the zero crossings of the terminal voltage, Vab, Vbc, Vca, pulses $P_{TP(ab)}$ (positive going zero crossing) and, $P_{TN(ab)}$ (negative-zero crossings) and, $P_{TP(bc)}$ and $P_{TN(bc)}$ and $P_{TP(ca)}$ and, $P_{TN(ca)}$, respectively, produced by zero crossing pulse generator 19. Each zero crossing pulse initiates the generation of the reference half periods, $TP_{(ab)}$ and $TN_{(ab)}$, $TP_{(bc)}$ and $TN_{(bc)}$, $TP_{(ca)}$ and $TN_{(ca)}$, each of which is derived from a precision high-frequency clock pulse generator 20 shown in FIG. 2. The half period reference generator produce pulses $R_{TN(ab)}$ and $P_{TN(ab)}$, $R_{TP(bc)}$ and $R_{TN(bc)}$, $R_{TP(ca)}$ and $R_{TN(ca)}$. The time difference between the reference half periods and the actual ones marked by the pulses $R_{TP(ab)} P_{TN(ab)}$ and $R_{TN(ab)} P_{TP(ab)}$, $R_{TP(bc)} P_{TN(bc)}$ and $R_{TN(bc)} P_{TP(bc)}$, $R_{TP(ca)} P_{TN(ca)}$ and $R_{TN(ca)} P_{TP(ca)}$ is the time error representing the variation of the steady state period time. This time difference or time error for a three terminal voltage is represented by pulses $E_{ab}$, $E_{bc}$, and $E_{ca}$ of constant magnitude and a polarity that indicates whether the actual half period time is longer, that is the generator frequency is lower (positive polarity) or shorter, that is, the generator frequency is higher (negative polarity), than the reference half period as illustrated in FIGS. 3 and 4. By integrating these error pulses, a voltage proportional to the frequency (and rotor velocity) change is obtained. As illustrated in FIG. 1, this voltage can be used to modulate the firing delay of the thyristor from a quiescent value (determined by the output voltage level of the bias signal supply) and thereby insert effective inductance to damp subsynchronous resonance.

Figure 5:
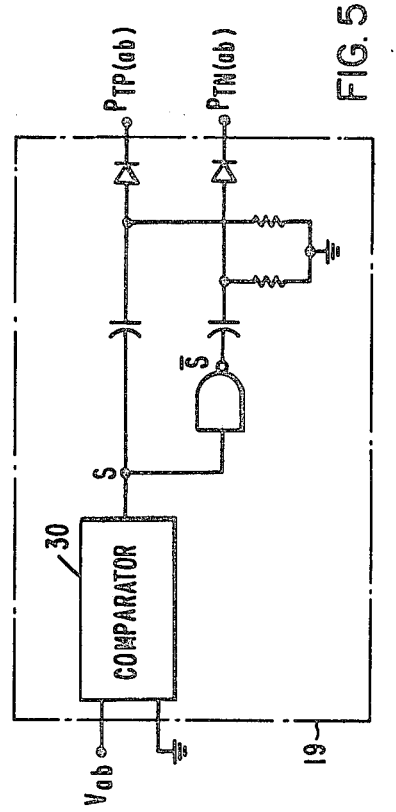
FIG. 5 is a typical single phase schematic diagram of the zero crossing pulse generator for a three phase system.
Figure 3A:
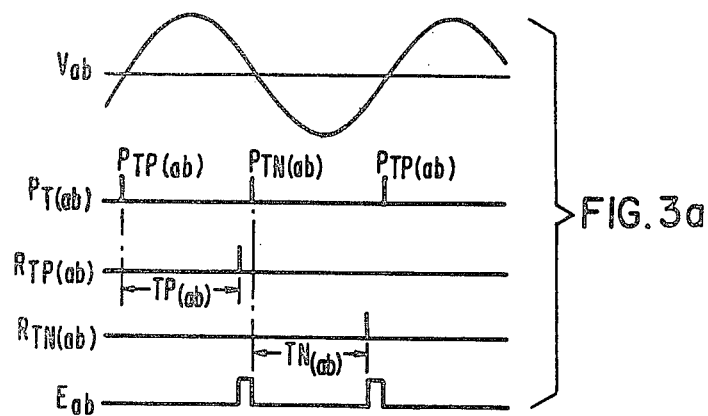
FIGS. 3a–3d are waveforms illustrating the operation of the proposed controls shown in FIG. 2 at frequencies lower than the nominal frequency.
Figure 3B:
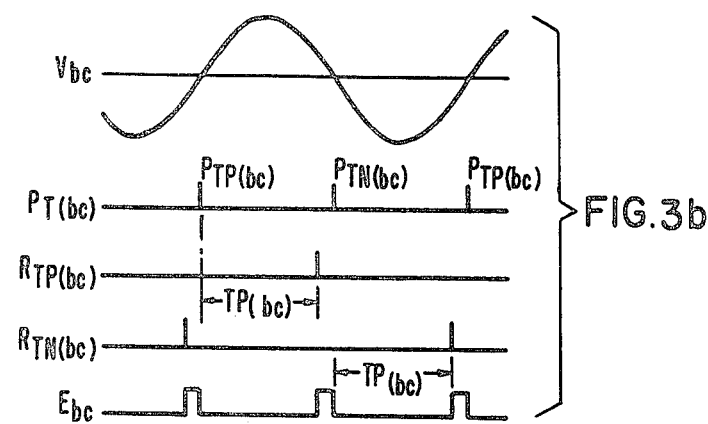
Figure 3C:
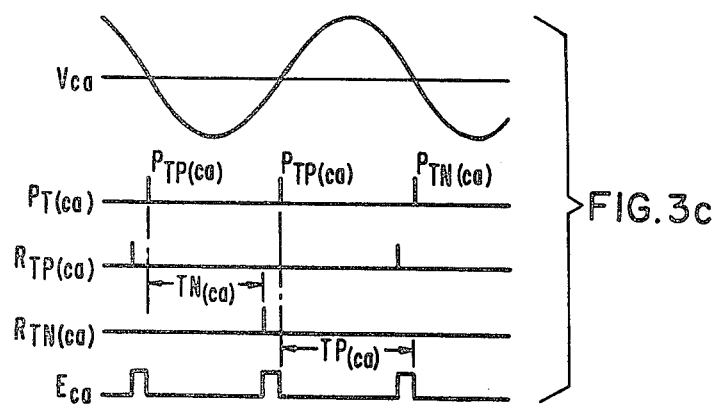
Figure 3D:
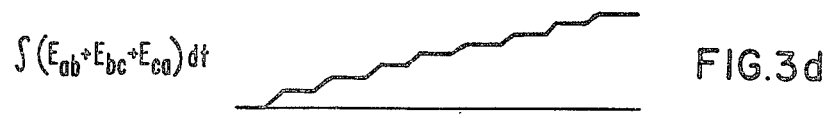
Figure 4A:
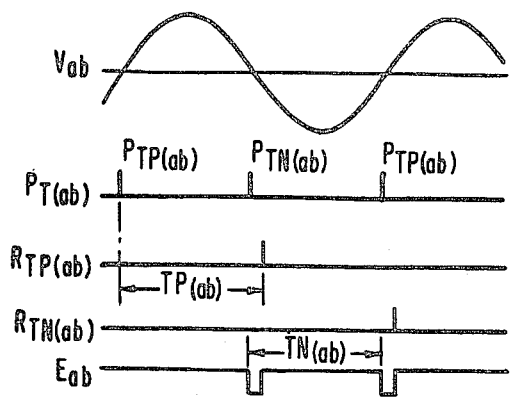
FIGS. 4a–4d are waveforms illustrating the operation of the proposed controls shown in FIG. 2 at frequencies higher than the nominal frequency.
Figure 4B:
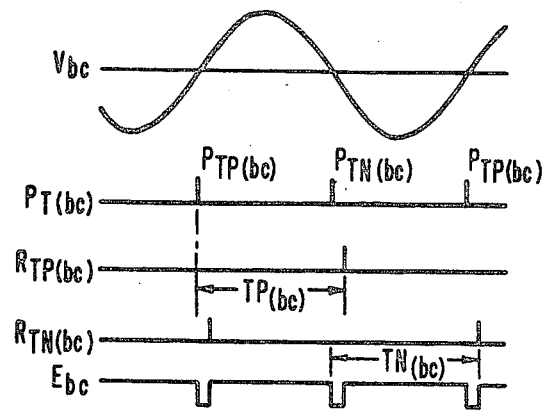
Figure 4C:
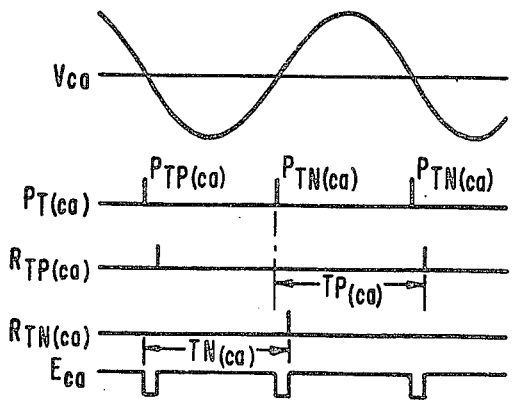
Figure 4D:
Figure 7:
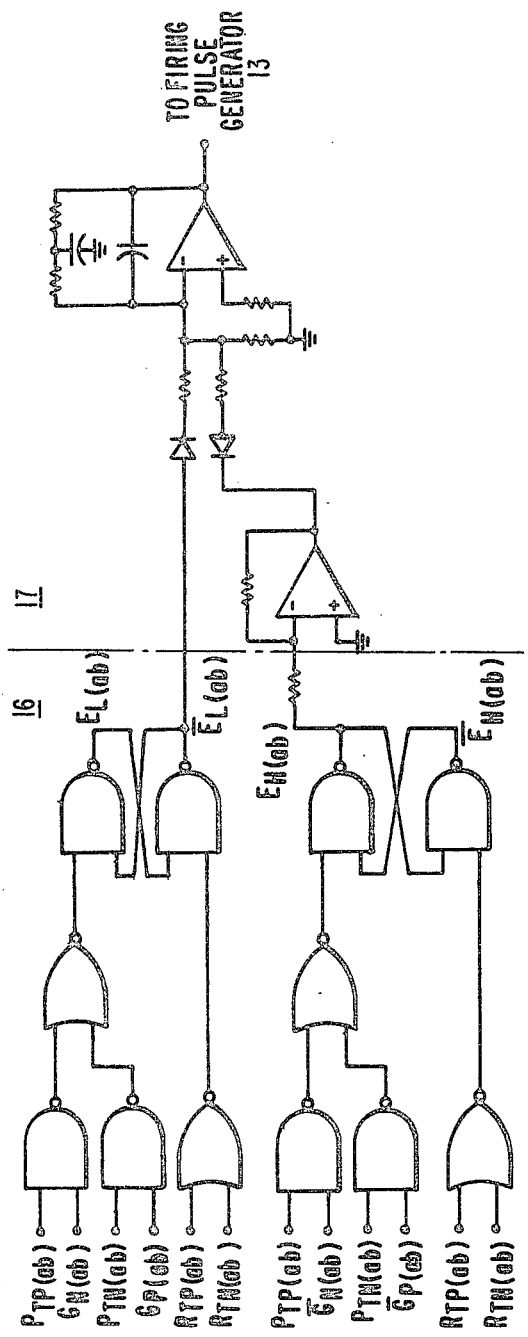
FIG. 7 shows typical single phase schematic block diagram for the error pulse generator and integrator for a three phase system.
Figure 6:
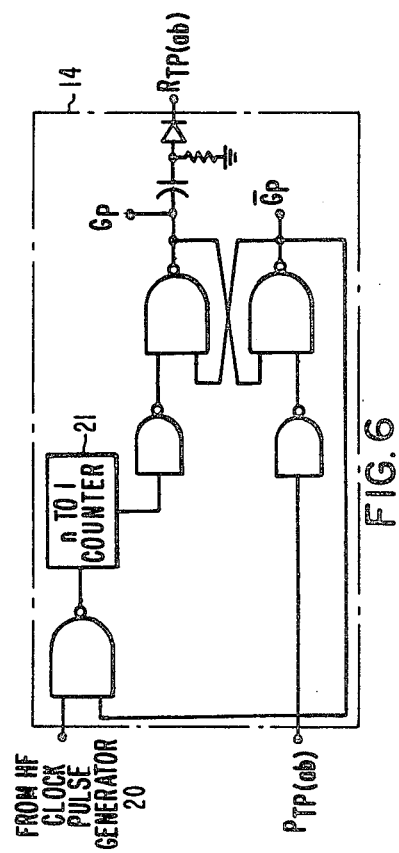
FIG. 6 shows a typical single phase schematic diagram typical of the half period reference generators for a three phase system.

The operation of the proposed control scheme is further explained by the more detailed functional diagrams in operating waveforms shown in FIGS. 5, 6, and 7. FIG. 5 illustrates for phase AB the derivation of the pulses $P_{TP(ab)}$ and $P_{TN(ab)}$ at the positive-going and, respectively the negative-going zero crossings of the terminal voltage Vab utilizing comparator 30 as shown.

FIG. 6 illustrates the derivation of the reference half period, $TP_{(ab)}$, and the corresponding pulse, $R_{TP(ab)}$, using the high frequency clock pulse generator 20 and a gated counter 21. The gate of the counter 21 is opened by the zero crossing pulse $P_{TP(ab)}$ and pulses of the high frequency clock pulse generator 20, appearing at precisely defined time intervals (for example, at every 1/12,000 interval of the half-period corresponding to 60 Hz.), are counted. When the count reaches the number corresponding to the reference half period (in the example used, 12,000), the last pulse closes the gate, and the counter stops until the next $P_{TP(ab)}$ pulse restarts the process again.

FIG. 7 illustrates a possible logic arrangement to derive the polarized error pulses representing the time difference between the reference half period and the measured one. The derivation of the error integral is also shown. The error integral is provided as an analog voltage signal, whose magnitude and polarity follows precisely the frequency variation of the terminal voltage. The high frequency clock pulse generator 20 can be a precision crystal oscillator resonating at some multiple of the 60 Hz. generator frequency (for example, at $2 \times 12,000 \times 60 = 1.44$ MHz). Because of the different steady-state accuracy between a frequency regulator of the generator and the crystal oscillator, a constant steady-state error may develop. To prevent the integrator from responding to slow or responding to steady-state (dc) error, its dc gain has to be reduced. This can be accomplished, for example, by the simple T-network consisting of a capacitor and two resistors, connected across the integrator's capacitors, as illustrated in FIG. 7. The high frequency clock pulse generator 20 can also be realized by a phase-locked loop incorporating a high frequency voltage control oscillator. Making the response of the phase-locked loop rather slow, the frequency of the voltage control oscillator will correspond to the main frequency of the generator voltage and will not follow the subsynchronism modulation caused by the torsional oscillation. Since the frequency of the voltage control oscillator in the phase-lock loop represent the exact multiple of the steady-state generator frequency, the previously described dc gain reduction for the error integrator is not necessary.

From the foregoing, it is readily seen that there is described a means to damp subsynchronous resonance without directly measuring the shaft velocity change of the generator. A novel method is devised to measure, with a negligible time delay, the frequency variation of the terminal voltage, and to generate a corresponding signal to modulate the conduction angles of the thyristor in the VAR generator.

Although there have been illustrated and described a specific embodiment, it is clearly understood that the same were merely for purposes of illustration and that changes and modifications may be readily made therein by those skilled in the art without departing from the spirit and scope of this invention.

I claim:

1. A static VAR generator and network stabilizer comprising:
   (a) a reactance means disposed for connection into an AC network;
   (b) a frequency monitoring means for measuring the period of the network voltage and comparing it to the period of a reference voltage cycle to detect subsynchronous resonance in said AC network;
   (c) a control means connected to said reactance means and said frequency monitoring means for connection of said reactance means into said AC network to damp subsynchronous resonance in said AC network.

2. A static VAR generator and network stabilizer as recited in claim 1 wherein said frequency monitoring means is further comprised of:
   (a) a network voltage frequency pulse generator disposed to generate pulses representing the period of the network voltage cycle;
   (b) a high frequency reference clock pulse generator disposed to generate pulses representing the period of an unmodulated reference terminal voltage for comparison with the AC network voltage;
   (c) an error pulse generator responsive to deviations in the signals of the network voltage frequency pulse generator and the signals of the high frequency reference clock pulse generatir;
   (d) an error pulse integrator responsive to the output of the error pulse generator disposed to produce a voltage proportional to the deviations of frequency between the network voltage frequency pulse generator and the high frequency reference clock pulse generator representing subsynchronous resonance; and
   (e) a firing pulse generator responsive to said error pulse integrator to modulate firing delays of thyristors disposed to insert said reactance means to dampen said subsynchronous resonance.

* * * * *